April 14, 1959  R. T. SHEEN  2,881,596
CONTROLLED VOLUME METERING OF LIQUEFIED GASES
Filed Aug. 30, 1956
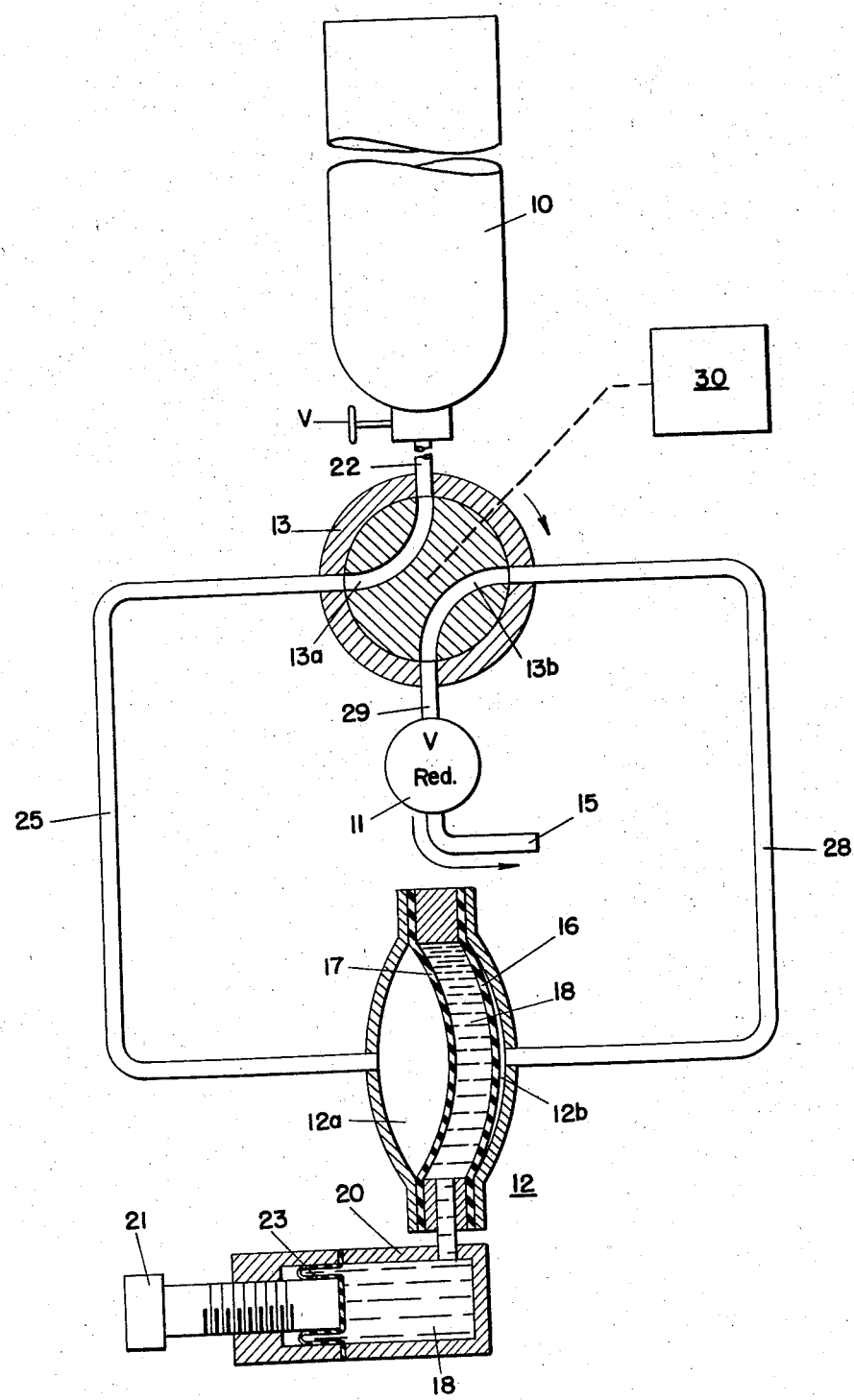

United States Patent Office 2,881,596
Patented Apr. 14, 1959

2,881,596

CONTROLLED VOLUME METERING OF LIQUEFIED GASES

Robert T. Sheen, Huntington Valley, Pa., assignor to Milton Roy Company, Philadelphia, Pa., a corporation of Pennsylvania Application August 30, 1956, Serial No. 607,023

2 Claims. (Cl. 62—55)

This invention relates to the dispensing of liquefied gases and has for an object the provision of systems for dispensing volumetrically measured quantities of a gaseous material while in the liquid phase.

In accordance with my Patent 2,678,541 there are disclosed methods of and apparatus for utilizing a positive displacement metering pump for adjustable controlled flow of liquid chlorine and for dispensing the same as a gas. In my said patent it was necessary, in order to maintain the chlorine in a liquid state, to increase the pressure of the chlorine as it passed through the pump thus having a pressure on the discharge side of the pump higher than that on the inlet side of the pump. It was also necessary to employ a separate pump-drive operated from a separate source of power to meter the liquid chlorine. While the particular mechanical arrangement of my said patent has been satisfactorily employed, I have now found that liquefied gas can be metered in controlled volume directly from the cylinder without increasing the gas pressure, as heretofore required, by, inter alia, using the pressure in the cylinder to actuate the pumping means.

In accordance with the present invention gaseous materials in the liquid phase are dispensed by metering the liquid in terms of volumetrically measured quantities thereof. This controlled volume method of volumetrically measuring the material while in the liquid phase is accomplished by applying the sum of (a) the pressure of the normally gaseous material within a container, that pressure being at least equal to the critical pressure of the gaseous material, and (b) a static pressure head developed by the location of the storage container at a height above a dispensing chamber which develops a static pressure head exceeding the pressure drop of the system between the container and a dispensing compartment of said chamber. The sum of said pressures is utilized to displace a movable means dividing the chamber into two dispensing compartments from a position alternately to fill one dispensing compartment with gaseous material in the liquid phase while dispensing the previously measured volume of the material from the other dispensing compartment. The pressure on the compartment from which the material is being dispensed is reduced or lowered to a value below that applied to the material in liquid phase filling the other compartment. In this manner there is provided a method and system of feeding or dispensing volumetrically measured quantities of the gaseous material in the liquid phase, the material after accurate measurement thereof being optionally supplied to the process or treating zones in either the liquid or gaseous phase.

For further objects and advantages of the invention and for a more detailed understanding thereof, reference is to be had to the following specification taken in conjunction with the drawing in which there has been illustrated schematically a system embodying the invention.

Referring to the drawing, the invention in one form has been shown as applied to a system in which gaseous material is in the liquid phase stored in a container 10. The gas pressure within the container 10 is normally above the critical pressure of the material to insure the maintenance of that material in the liquid phase. Since the gaseous material is stored in the container 10 in the liquid phase and with the gas pressure therein above the critical pressure, that critical pressure is maintained throughout the delivery of the gaseous material in liquid phase since the change in volume within container 10 due to the flow of liquid therefrom is quite inconsequential in terms of the resultant change on the pressure within the container or supply vessel 10. This container is positioned above the dispensing system so as to develop a static pressure head with a magnitude dependent upon the height of the liquid level above the zone in which that material is to be dispensed in volumetrically measured quantities while in the liquid phase. Thus upon the liquid within pipe 22 there will be applied an actuating pressure $P_i$ equal to the sum of the aforesaid pressures. Mathematically the actuating pressure may be expressed by the following equation:

(1) $$P_i = P_c + P_h$$

where $P_c$ is not less than the critical pressure of the gas, and
$P_h$ is the static pressure head of the liquid gas.

The gaseous material in liquid phase flows from container 10 by way of line 22 and a control valve 13 to a pump chamber 12 divided into two compartments 12a and 12b by a movable means 16—18 for the volumetric measurement of desired quantities of the material in the liquid phase. In accordance with the invention the dispensing of volumetrically measured quantities of the material in the liquid phase is accomplished by utilizing the sum of the aforesaid pressures for the actuation of the movable means 16—18. With the control valve 13 in the position illustrated, the sum of said pressures produces a flow of liquid into the pipe 25 from container 10, pipe 22 and passage 13a until compartment 12a is substantially filled. As the movable means 16—18 arrives at its final position, compartment 12a will have been completely filled with liquid. This compartment of known and invariable volume for a given setting of the device predetermines the volumetrically measured quantity of the material in the liquid phase to be delivered to a discharge or delivery pipe 15. Assuming the compartment 12b, of the same volume as the compartment 12a, to have been previously filled with the gaseous material in the liquid phase, it will be seen as the diaphragm 16 is moved against a wall of the chamber 12 there will have been delivered through the line 28, a passage 13b of the valve 13 and a reducing valve 11, a volume of gaseous material corresponding with the volume of that gaseous material in the liquid phase equal to the volume of compartment 12b. As the movable means 16—18 completes its movement, the control valve 13 is rotated through 90° to interchange the connections 13a and 13b between the storage container 10 and the lines 25 and 28. Thus the sum of said pressures will then be applied by way of the line 28 to fill the compartment 12b and at the same time to force from the compartment 12a through pipe 29 and to the delivery line 15 a quantity of gaseous material when in the liquid phase equal to the volume of compartment 12a.

The outlet or discharge pressure $P_o$ of the system in pipe 29 may be expressed by the following equation:

(2) $$P_o = P_i - P_d$$

where $P_d$ is the drop in pressure through the system. By providing a compartmental chamber 12 and a control valve 13, the gas is maintained in liquid phase while it is metered and it is delivered in metered flow at reduced pressure from the pipe 29 to the outlet pipe 15 for delivery to its ultimate destination. The static pressure head, $P_h$, developed by the location of the storage container at a height above the dispensing chamber 12, exceeds $P_d$, the drop in pressure through the system, that is, between supply vessel or container 10 and the chamber 12. While the pipe 29 may discharge directly to atmospheric pressure, there are numerous advantages to be had in accordance with the present invention by employing a reducing valve 11 on the downhill side of the chamber 12 between pipe 29 and outlet pipe 15 to control the pressure differential between $P_i$ and $P_o$. By maintaining the aforesaid differential of pressure, positive actuation of the movable means 16—18 is attained.

While the chamber 12 comprising the compartments 12a and 12b may be formed by a single diaphragm, and while the movable means actuated by the sum of said pressures may take different forms as illustrated in Byrant Patent 2,576,747, it has been illustrated as including two flexible diaphragms 16 and 17 separated one from the other by a non-compressible liquid 18 the volume thereof between said diaphragms 16 and 17 being adjustable to establish selected volumes for the compartments 12a and 12b. For example, as an adjusting means, comprising a threaded member 21, is moved in the right hand direction, the volume of a control chamber 20 is reduced to force liquid 18 therein into the space between the diaphragms 16 and 17. As the volume between the diaphragms 16 and 17 is increased, there is a corresponding reduction in the maximum volume obtained by the compartments 12a and 12b. By moving the adjusting means 21 to the left, the maximum volume of each volume-measuring compartment 12a and 12b is increased. The diaphragm 23 is preferably included as a part of the volume-adjusting means to prevent the possibility of leakage in the volume-setting means. The foregoing adjustment of member 21 may be made manually or automatically in accordance with process demand.

The reducing valve 11 is of the adjustable type which maintains the pressure between it and the flexible diaphragm wall in pump chamber 12 at a controlled pressure below the pressure of the liquefied gas supply in cylinder 10. This insures that there will be adequate pressure differential between the inlet and discharge sides of the diaphragm pump chamber 12 so that the supply pressure will provide the motive power for the pumping operation and so that there will be maintained great accuracy in dispensing the liquefied gas. The reducing valve 11 will control the pressure at which the liquefied gas enters outlet pipe 15 and it also controls the speed of operation of the diaphragm 16—17 as it moves from one side of the pump chamber to the other. In processes requiring fast movement of the diaphragm, the valve 11 may be set to maintain a high pressure differential between the two compartments of the pump 12. In processes where the speed of movement of the diaphragm is not critical, a lower pressure differential may be maintained by adjustment of valve 11, such lower pressure differential being useful in prolonging the life of the pump diaphragm. The reducing valve 11 may be adjusted manually or automatically in accordance with the requirements of the process.

The control valve 13 has been illustrated schematically as including separate flow passages 13a and 13b and is of the four way type. While the valve 13 may be of various constructions such as reciprocating or rotary, it has been illustrated in simplified form and one preferred form is the leak-proof diaphragm type described and claimed in my copending application Serial No. 599,628, filed July 23, 1956.

While the movable portion of valve 13 may be actuated manually to repeat the pumping cycle, it is preferably operated automatically in accordance with an actuating signal derived from the process to which the liquefied gas is being supplied. The actuating means for the control valve 13 has been shown schematically as device 30 which may take the form of a timer for operating the controlled valve 13 at predetermined time intervals or it may take the form of a measuring instrument or other similar device responsive to the demand of the process. Further examples are described in my aforesaid copending application.

From the foregoing it will be observed that pressure from the container 10 is utilized not only for positive actuation of the diaphragms 16—17 but also to maintain the gas in liquid phase throughout its passage through the pump chamber 12 after which it may be dispensed either as a liquid or as a gas as the process may require.

The present invention provides a system where liquefied gases can be accurately metered while in their liquid phase with the supply pressure being utilized to provide the motive power for the metering operation and there is an absence of moving parts of the nature which require bushings, seals and other factors which complicate the apparatus and increase the cost of the apparatus required for dispensing liquefied gases. By simple manipulations or by automatic control adjustments may be made in the volume of liquid metered per stroke, the frequency of the strokes and the speed with which the liquid is metered per stroke.

As more fully explained in my Patent 2,678,541 dispensing normally gaseous materials by accurate volumetric measurement in the liquid phase makes possible highly accurate control of the amount of gas added to the process. Where efforts are made to volumetrically measure gaseous material while in the gas phase compressibility represents but one factor or variable difficult to control and which detracts from the accuracy of the measurement. However by measuring the gaseous material in the liquid phase, there is avoided entirely the problem of compressibility except as applicable to liquids. Liquids, while compressible to some degree, may, for most purposes, be considered as substantially non-compressible and in all cases the order of compressibility differs so much from that of the material in gaseous phase that the accuracy of volumetric measurement is not affected.

Examples of liquefied gases which are particularly suited to the present invention include liquid ammonia, liquid sulfur dioxide, liquid chlorine, etc. Liquid ammonia, for example, can be metered volumetrically in liquid phase by this novel system for delivery of ammonia to the distribution systems which may include sprinkling systems buried in the ground or nozzles mounted on tractors, the ammonia being mixed with water in the distribution pipes or at the nozzles. The high solubility of ammonia makes this proposed method a desirable one for fertilizing purposes.

In accordance with the present invention an improved method of treating boiler feed water is contemplated. Heretofore it has been the practice to dissolve sodium sulphite in water and feed it with a controlled volume pump using this reagent to chemically remove residual dissolved oxygen remaining after mechanical deaeration. The sodium sulphite reacts with the dissolved oxygen to form sodium sulphate. This has the disadvantage of requiring solution in a chemical mixing tank, taking adequate precautions to prevent premature reaction with oxygen of the air, and then feeding the solution to the boiler feed water system.

In accordance with the present invention liquid sulfur dioxide taken directly from the supply container is volumetrically measured and dispensed to the boiler feed water at the storage space of a deaerated heater or at the suction side of the boiler feed pump. The sulfur dioxide then in gaseous form immediately dissolves in the water at the point of application eliminating the necessity for intermediate solution tanks and eliminating the necessity for additional handling of the chemical. This system has the further advantage of permitting fewer dissolved solids to be added to the boiler feed water than when sodium sulfite is added as the sulfur dioxide reacts with the water to form sulfurous acid. In many boiler feed waters it is desirable to lower the alkalinity and this reaction to form sulfurous acid has the added advantage of achieving this objective as well as scavenging residual dissolved oxygen.

While my invention has been described in connection with a preferred embodiment of the invention, it will be understood that further modifications may be made without departing from the spirit and scope of the invention as set forth in the appended claims.

What is claimed is:

1. A system for metering liquefied gas in liquid phase and feeding it to a process, comprising a supply vessel containing a quantity of liquefied gas at a pressure above its critical pressure, a plural way valve flow-connected to said supply vessel, a pump chamber, diaphragm means including spaced flexible diaphragms dividing said pump chamber into separate portions, means for introducing a variable quantity of a liquid between said spaced flexible diaphragms to vary the effective volume of said pump chamber and hence the pump capacity, separate flow connections from said plural way valve to each of said portions on opposite sides of said diaphragm means, a discharge flow connection from said valve, control means for changing the position of said plural way valve alternately to admit liquid from said supply vessel at a pressure above the critical pressure of the liquefied gas first to one side and then to the other side of said diaphragm means for displacing liquefied gas from one portion of said pump chamber during entry to the other portion of said pump chamber of liquefied gas, and valve means in said discharge connection for reducing to a predetermined value below said critical pressure the pressure upon the liquefied gas being displaced from said portion.

2. The system of claim 1 in which said supply vessel is disposed at a height above said pump chamber for adding to the storage pressure of said liquefied gas at the location of said pump chamber of a static pressure head exceeding the pressure drop from said supply vessel to said pump chamber.

References Cited in the file of this patent

UNITED STATES PATENTS

| | | |
|---|---|---|
| 1,771,170 | Eule | July 22, 1930 |
| 2,273,213 | McClay | Feb. 17, 1942 |
| 2,560,948 | Hannibal | July 17, 1951 |
| 2,576,747 | Bryant | Nov. 27, 1951 |
| 2,631,437 | Bruce | Mar. 17, 1953 |
| 2,673,038 | Vernet | Mar. 23, 1954 |
| 2,678,541 | Sheen | May 18, 1954 |

FOREIGN PATENTS

| | | |
|---|---|---|
| 377,939 | Great Britain | 1932 |